US009893586B2

(12) United States Patent
Tomizawa et al.

(10) Patent No.: US 9,893,586 B2
(45) Date of Patent: Feb. 13, 2018

(54) DRIVER APPARATUS PROVIDED WITH A MOTOR AND A CONTROL UNIT

(71) Applicant: DENSO CORPORATION, Kariya, Aichi-pref. (JP)

(72) Inventors: HIroki Tomizawa, Chiryu (JP); Makoto Taniguchi, Obu (JP); Hiroshi Imai, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 356 days.

(21) Appl. No.: 14/609,517

(22) Filed: Jan. 30, 2015

(65) Prior Publication Data

US 2015/0222156 A1    Aug. 6, 2015

(30) Foreign Application Priority Data

Jan. 31, 2014    (JP) .................................. 2014-16525

(51) Int. Cl.
*H02K 5/10*    (2006.01)
*H02K 5/22*    (2006.01)
*H02K 11/33*    (2016.01)

(52) U.S. Cl.
CPC .............. *H02K 5/10* (2013.01); *H02K 5/225* (2013.01); *H02K 11/33* (2016.01)

(58) Field of Classification Search
CPC ........... H02K 5/10; H02K 5/225; H02K 11/33
USPC .................................. 310/68 D, 71, 89, 88
IPC ........................................................ H02K 5/10
See application file for complete search history.

(56) References Cited

U.S. PATENT DOCUMENTS

| 5,334,897 | A  | * | 8/1994  | Ineson  | H02K 5/08  |
|           |    |   |         |         | 310/401    |
| 2004/0119361 | A1 | * | 6/2004  | Neet    | H02K 3/24  |
|           |    |   |         |         | 310/208    |
| 2012/0286604 | A1 | * | 11/2012 | Abe     | H02K 5/225 |
|           |    |   |         |         | 310/71     |
| 2013/0099611 | A1 | * | 4/2013  | Suga    | H02K 5/225 |
|           |    |   |         |         | 310/71     |
| 2014/0054991 | A1 |   | 2/2014  | Hyodo   |            |
| 2014/0070647 | A1 | * | 3/2014  | Kawamata | H02K 3/525 |
|           |    |   |         |         | 310/71     |

(Continued)

FOREIGN PATENT DOCUMENTS

| JP | 56-141489 | 10/1981 |
| JP | 59-87186  | 6/1984  |
| JP | 11-89156  | 3/1999  |

OTHER PUBLICATIONS

Office Action (4 pgs.) dated Jan. 28, 2016 issued in corresponding Japanese Application No. JP-2014-016525 with an at least partial English language translation (4 pgs.).

*Primary Examiner* — John K Kim
(74) *Attorney, Agent, or Firm* — Nixon & Vanderhye P.C.

(57) ABSTRACT

A seal member of a driver apparatus contacts a case and a first frame end. The seal member has an opening in which a lead wire is inserted and an inside wall surface of the opening contacts the lead wire. Further, the seal member is made of a stretchable material, and is held in position only by a binding force between the case and the first frame end. The seal member is fixedly held by the first frame end and the case after an insertion of the lead wire in the opening and disposition on the fixing member opposing face. Therefore, an installation of the seal member is performed by an inserting the lead wire into the opening and a positioning the seal member on the case.

12 Claims, 7 Drawing Sheets

(56) References Cited

U.S. PATENT DOCUMENTS

2014/0339966 A1 11/2014 Tomizawa et al.
2015/0222156 A1* 8/2015 Tomizawa ............. H02K 5/225
　　　　　　　　　　　　　　　　　　　　　　310/88

* cited by examiner

DRIVER APPARATUS PROVIDED WITH A MOTOR AND A CONTROL UNIT

CROSS REFERENCE TO RELATED APPLICATION

The present application is based on and claims the benefit of priority of Japanese Patent Application No. 2014-016525, filed on Jan. 31, 2014, the disclosure of which is incorporated herein by reference.

TECHNICAL FIELD

The present disclosure generally relates to a driver apparatus provided with a motor and a control unit for controlling the motor.

BACKGROUND INFORMATION

In a motor having a stator and a rotor within a case, in order to connect a lead wire of a coil of the stator to an external control device, it is necessary for the lead wire to extend out of the case through a through hole of the case. When such a structure is used, a foreign substance may enter the case from outside of the case through the through hole, thereby, causing an adverse effect on the operation of the motor.

In coping with such a situation, a patent document 1 (i.e., Japanese Patent Laid-Open No. H11-89156) discloses the following structure, in which a seal member is provided which is made of rubber and has a ring part that engages with an entire edge of the through hole of the case. The seal member also includes a cork part that engages an inner wall of the ring part and has a hole for inserting the lead wire. As such, the seal member seals the through hole of the case.

If a driver apparatus having a one-body structure of a motor and its control unit for the control of the motor is taken into consideration, the lead wire of the coil of the stator in the motor extends through the through hole of the case of the motor to an outside of the case, and is connected to the control unit. Then, for sealing the through hole of the case, a seal member as described in patent document 1 may be used.

However, in order to install/assemble such a seal member, the ring part is disposed in the through hole of the case while being first deformed, and then the cork part is engaged with an inside of the ring part while having the lead inserted thereinto. Further, assembly must be performed manually by hand. Therefore, attachment of the seal member takes time and is difficult to automate.

SUMMARY

It is an object of the present disclosure to provide a driver apparatus that enables a reduced number of work steps for an installation of a seal member that seals a through hole of the case, and that enables an automated installation of the seal member.

In an aspect of the present disclosure, the driver apparatus of the present disclosure includes a case, a stator fixedly disposed in the case, a rotor rotatably disposed relative to the stator, a fixing member attached to the case, a controller controlling a power supply to a coil of the stator, and a seal member disposed at a position between the case and the fixing member. The case has a fixing member opposing face that faces the fixing member, and the fixing member has a case opposing face that faces the fixing member opposing face of the case. The case has a first through hole that opens on the fixing member opposing face through which a lead wire of the coil is inserted. The fixing member has a second through hole that opens on the case opposing face through which the lead wire is inserted. The seal member contacts the fixing member opposing face and the case opposing face and is held in position solely by a binding force between the case and the first frame end, the seal member has an opening through which the lead wire is inserted and an inside wall surface of the opening contacts the lead wire, and the seal member is made of a stretchable material.

Further, the seal member includes a base portion that is in contact with one of the fixing member or the case and in non-contact with an other of the fixing member or the case, and a rib portion having a ring shape and protruding from the base portion toward and being in contact with the other of the fixing member or the case.

Also, the base portion of the seal member has a cavity with an inner diameter greater than an outer diameter of the lead wire, and the seal member has a protruding portion that protrudes from the base portion to define a periphery of the cavity, the protruding portion protrudes into the second through hole and has a tip portion that is disposed on one axial end of the protruding portion, the opening is positioned on the tip portion, and the protruding portion has a cylinder shape with an inner diameter that is greater than the outer diameter of the lead wire.

Even further, the protruding portion of the seal member protrudes toward the controller relative to the second through hole.

Additionally, an inside wall surface of the protruding portion of the seal member has a tapered shape with a decreasing inner diameter that decreases toward the opening relative to the cavity.

Still further, the seal member has an inner tip portion that is connected to the inside wall surface of the protruding portion and positioned adjacent to the opening on a cavity side of the tip portion, and the inner tip portion has an inner diameter that continuously changes from the opening to the inside wall surface.

Moreover, the protruding portion has an outside wall surface with a tapered shape and a decreasing outer diameter along an axial direction away from the base portion.

Yet further, the lead wire and the opening have corresponding square-shaped cross sections.

In addition, the driver apparatus of the present disclosure includes a plurality of lead wires. The seal member has a plurality of openings corresponding to a quantity of the plurality of lead wires.

Further, the inside wall surface of the opening has surface texturing.

Also, the coil has a neutral connection portion that protrudes toward the fixing member and has a Y connection shape. The base portion of the seal member has a cover portion that is positioned between the fixing member and the neutral connection portion.

Even further, the cover portion of the seal member has a concave shape that concaves toward a fixing member and covers the neutral connection portion.

Additionally, the driver apparatus serves as a power source for driving an in-vehicle power steering apparatus.

The feature of the present disclosure is the seal member. The seal member has an opening that is in contact with the first and second facing surfaces and that has the lead inserted therein and that has its inside wall surface configured to be in contact with the lead. Further, the seal member is made of a material having stretchable/elastic characteristics, and is held only by a binding force from the case and the fixing member.

The seal member and fixing member configured in the above-described way are assembled and attached to the case, for example, in a procedure of the following steps (1) and (2).

(1) The lead wire is inserted in the opening of the case to extend to and protrude from the first through hole, while disposing the seal member on the first facing surface.

(2) The lead is inserted in the second through hole of the fixing member, while attaching and assembling the fixing member on to the case.

In the above procedure, even though the seal member is not yet completely fixedly disposed onto the case, handling of the seal member is complete in step (1) in terms of operation of installation/assembly. Then, after step (2), the seal member is fixedly disposed to the case in a binding manner at a position in between the case and the fixing member. That is, the installation step for assembling the fixing member onto the case serves as a fixedly disposing step for disposing the seal member.

Therefore, when installing/assembling the seal member, the lead is inserted into the opening, while disposing the seal member to the case, which simplifies and reduces the number of work steps, which allows for the automation of such work steps.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, one embodiment of present disclosure is described based on the drawings.

One Embodiment

Figure 1:
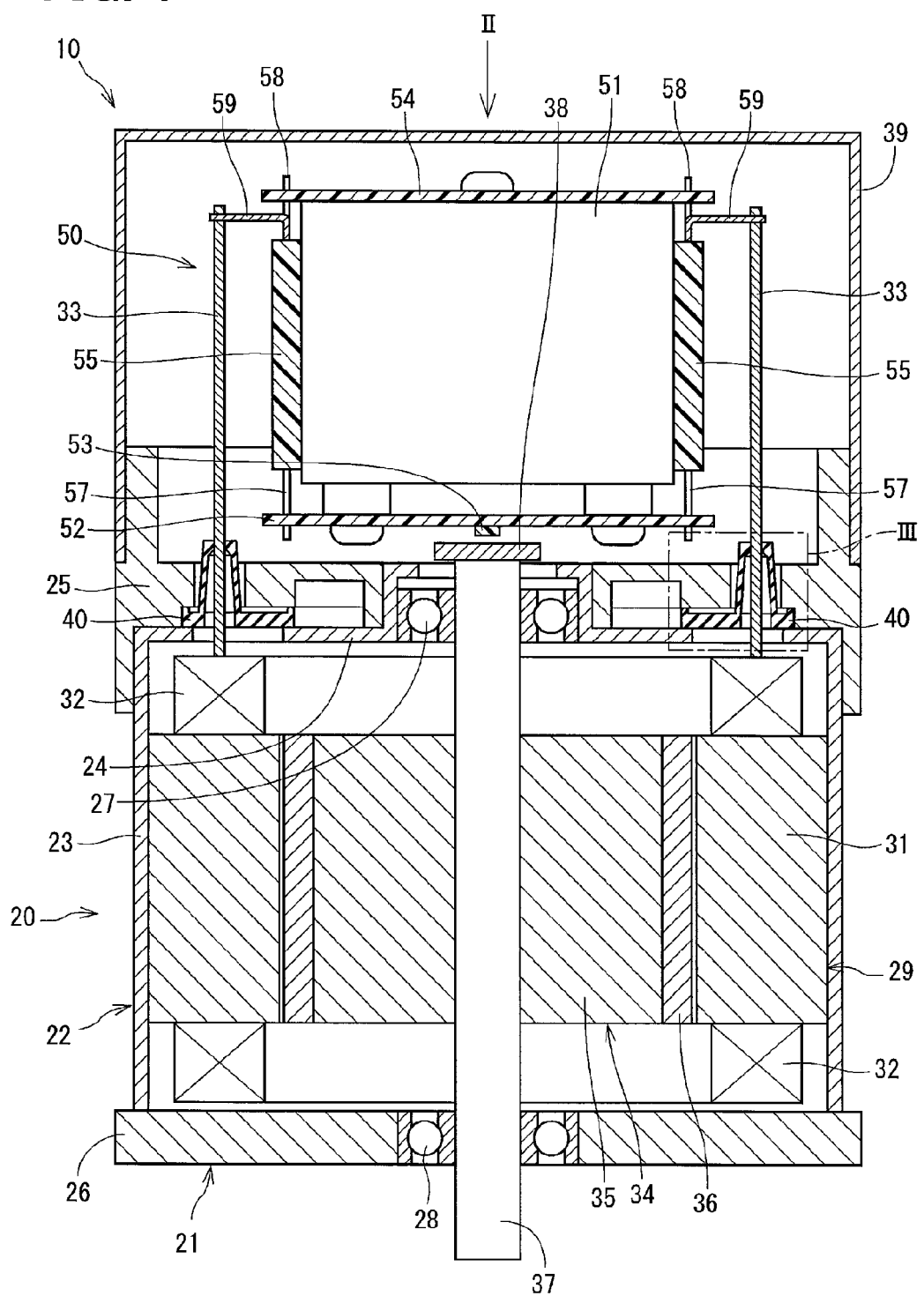
FIG. 1 is a sectional view of a driver apparatus in one embodiment of the present disclosure.

The driver apparatus in one embodiment of the present disclosure is used, for example, as a driving power source of an electric power steering device of the vehicles. As shown in FIG. 1, a driver apparatus 10 is a driver apparatus having one body structure that has a motor 20 and a controller 50 that controls the motor 20 in one body.

[Entire Configuration]

First, an entire configuration of the driver apparatus 10 is described with reference to FIG. 1.

(Motor)

The motor 20 is provided with a housing 21, a stator 29, a rotor 34, a revolving shaft 37, and a seal member 40. In the present embodiment, the motor 20 is a three-phase brushless motor.

The housing 21 comprises a case 22, a first frame end 25, and a second frame end 26. The case 22 has a cylinder shape with a bottom that closes one end of the cylinder shape, and includes a cylinder part 23 and a bottom part 24. A bearing 27 is disposed at the center of the bottom part 24 of the case 22. The first frame end 25 is provided on a bottom part 24 side of the case 22. The second frame end 26 is disposed to cover an open end of the cylinder part 23 of the case 22. A bearing 28 is disposed at the center of the second frame end 26. The first frame end 25 and the second frame end 26 hold the case 22 in a binding manner, and are fixedly attached to each other with multiple through bolts which are not illustrated.

The seal member 40 is disposed at a position between the bottom part 24 of the case 22 and the first frame end 25.

The stator 29 comprises a stator core 31 that is caulked to an inside of the case 22 and a coil 32 inserted in a slot of the stator core 31. The coil 32 includes three-phase winding which consists of a U phase winding, a V phase winding, and a W phase winding. The coil 32 includes 2 sets of three-phase winding in the present embodiment. A lead wire 33 of each of the three phase winding is inserted and extends through the bottom of the case 22 and the first frame end 25, toward an outside of the housing 21.

The revolving shaft 37 is supported by the bearings 27 and 28 in a rotatable manner. Both ends of the revolving shaft 37 extend out of the housing 21. A detection object 38, which is made of a permanent magnet, is fixed onto one end part of the revolving shaft 37. This detection object 38 is used to detect a rotation angle of the revolving shaft 37 by a rotation angle sensor 53 described below.

The rotor 34 is disposed pivotally inside of the stator 29, and comprises a rotor core 35 and multiple permanent magnets 36. The rotor core 35 has a cylindrical shape and is fixedly disposed on the revolving shaft 37. Each of the permanent magnets 36 is arranged along a periphery of the rotor 34. Two adjacent permanent magnets 36 which are disposed side by side along the periphery are magnetized so that magnetic poles on a radial outside of the magnets 36 are opposite to each other.

(Control Unit)

A controller 50 is provided with a heat sink 51, a control board 52, a rotation angle sensor 53, a power board 54, a power module 55 and the like.

The heat sink 51 is disposed in a cover 39 attached to the housing 21, and is fixed to the first frame end 25. The first frame end 25 is equivalent to a "fixing member" in the claims.

The control board 52 is disposed at a position between the heat sink 51 and the first frame end 25. On the control board 52, electronic components of a control system having a relatively small electric current amount such as the rotation angle sensor 53, the microcomputer which is not illustrated, etc. are mounted.

The rotation angle sensor 53 is disposed at a facing position to face the detection object 38 on an axis line of the motor 20. The rotation angle sensor 53 detects the rotation angle of the detection object 38, i.e., a rotation angle of the revolving shaft 37 and the rotor 34, by detecting the magnetic flux of the detection object 38.

The power board 54 is disposed on the opposite side of the heat sink 51 relative to the control board 52.

The electronic components of a power system having a relatively large electric current amount such as the capacitor, a choke coil, etc. (not illustrated) are mounted on the power board 54.

The power module 55 (not illustrated) has a switching element which switches the electric current to each of the phase windings of the stator 29. According to the present embodiment, two power modules 55 are disposed corresponding to 2 sets of three-phase winding. The power module 55 is disposed on both sides, that is, sandwiches the heat sink 51.

The power module 55 has, as a terminal projecting from a mold part 51 which molds the switching element, a control terminal 57, a power terminal 58, and a motor terminal 59. The control terminal 57 is connected to the control board 52. The power terminal 58 is connected to the power board 54. The lead wire 33 is connected to the motor terminal 59.

In the driver apparatus 10 constituted in the above-described way, the electrical signal which indicates the rotation angle of the revolving shaft 37 detected by the rotation angle sensor 53 is outputted to the controller 50. When the electric current to each phase winding of the coil 32 of the stator 29 is switched one by one by the controller 50, a revolving magnetic field is caused, and the rotor 34 rotates with the revolving shaft 37 according to magnetic attraction and repulsion forces resulting from such a revolving magnetic field.

In the driver apparatus 10, since the controller 50 is disposed on one end side of the shaft of the motor 20, the controller 50 is prevented from directly receiving vibration of the motor 20.

The first frame end 25 is made as an aluminum die cast part, for example, and is made with precision. Therefore, the controller 50 disposed on the first frame end 25 has an improved position accuracy relative to the motor 20, and has an improved heat dissipation capacity for dissipating heat from the controller 50.

The case 22 has a cylinder shape, and is made of a soft magnetic material, and the first frame end 25 is fitted onto the bottom part 24 of the case 22. Thereby, while the first frame end 25 has an improved position accuracy in terms of the installation position of the end 25, the bottom part 24 of the case 22 at a position between the motor 20 and the controller 50 functions as a magnetic shield which intercepts a leakage magnetic flux which is emitted from the motor 20. Therefore, the rotation angle sensor 53 is enabled to be positioned close to the motor 20.

[Feature Configuration]

Next, the feature configuration of the driver apparatus 10 is described with reference to FIGS. 1-7. In the following description, a fixing member opposing face 61 is defined as a part of a surface of the bottom part 24 of the case 22 opposing the first frame end 25, and a case opposing face 62 is defined as a part of the first frame end 25 opposing the fixing member opposing face 61. The bottom of a concave part 63 in the first frame end 25 is included in the case opposing face 62.

Figure 2:
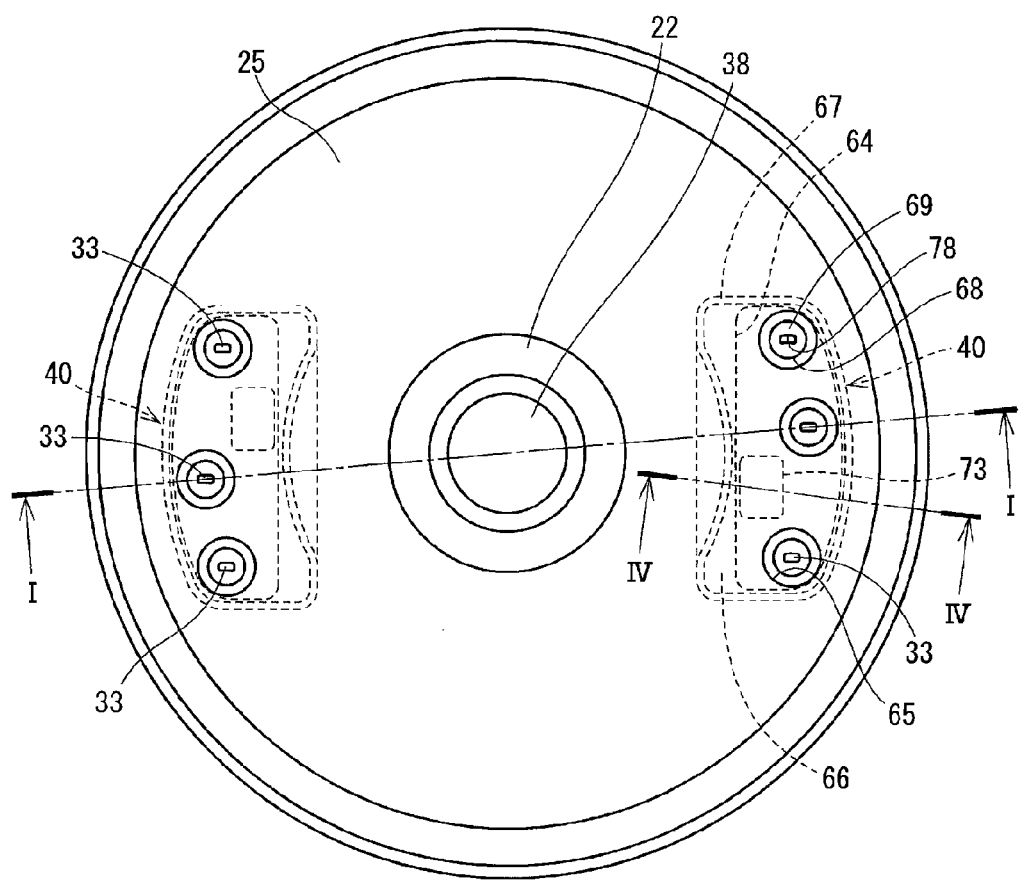
FIG. 2 is a top view of a motor of FIG. 1 seen in an arrow II direction.
Figure 3:
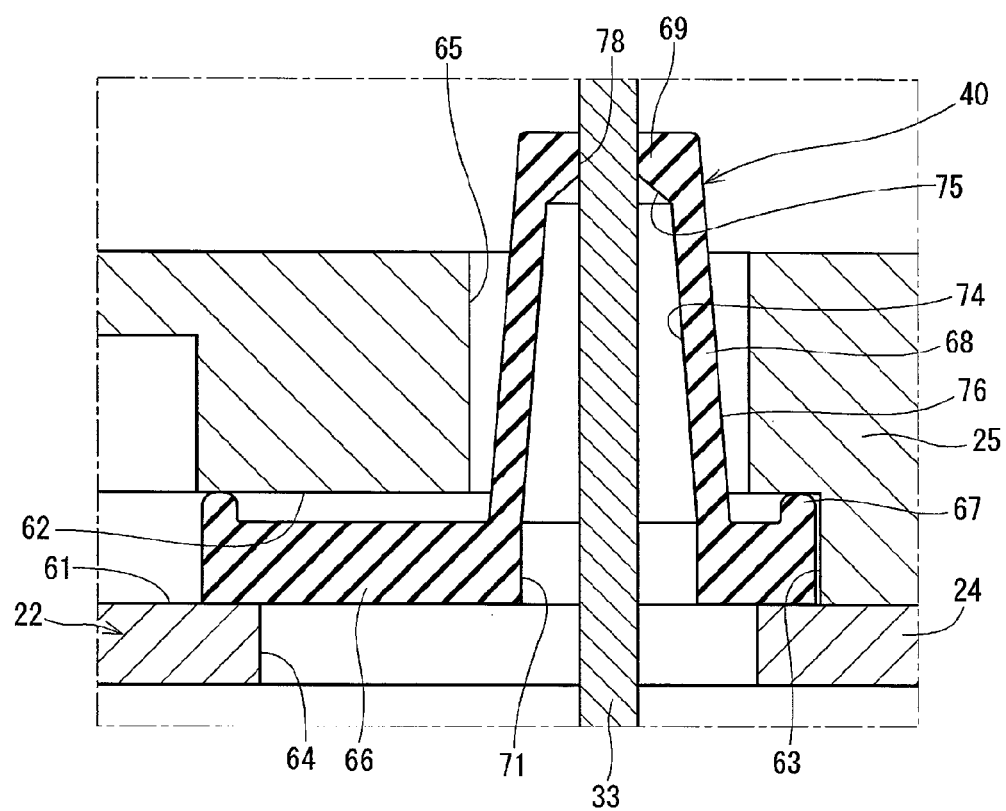
FIG. 3 is an enlarged view of a square III portion of FIG. 1 contained in a dotted-broken line.

As shown in FIG. 3, the bottom part 24 of the case 22 has a first through hole 64 that opens on the fixing member opposing face 61, and that has the lead wire 33 inserted therein. According to the present embodiment, the two first through holes 64 are provided corresponding to 2 sets of three-phase winding. As shown in FIG. 2, three lines of lead wire 33 are insert in one first through hole 64.

As shown in FIG. 3, the first frame end 25 has a second through hole 65 that opens on the case opposing face 62, and that has the lead wire 33 inserted therein. As shown in FIG. 2, in the present embodiment, six pieces of second through holes 65 are provided corresponding to six lead wires 33. One lead wire 33 is inserted into one second through hole 65.

As shown in FIG. 3, the seal member 40 is made of rubber that is stretchable and elastic, and has a base portion 66, a rib portion 67, a protruding portion 68, and a tip portion 69. According to the present embodiment, two seal members 40 are provided corresponding to 2 sets of three-phase winding.

Figure 4:
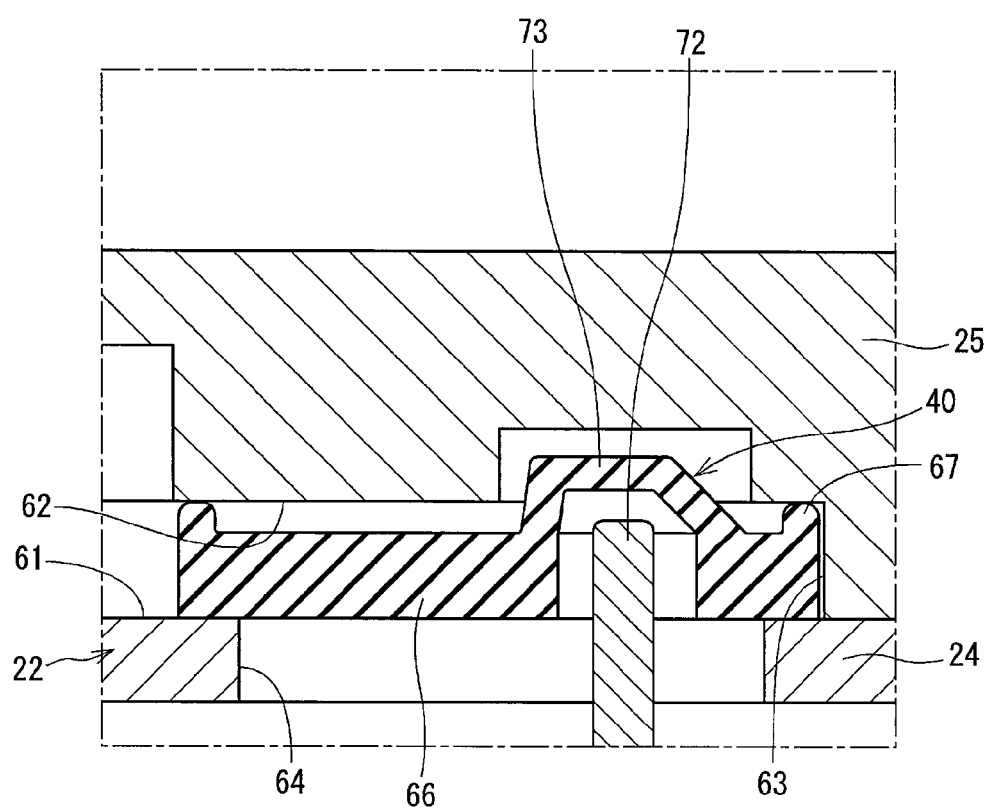
FIG. 4 is a sectional view of FIG. 2 along a IV-IV line.
Figure 5:
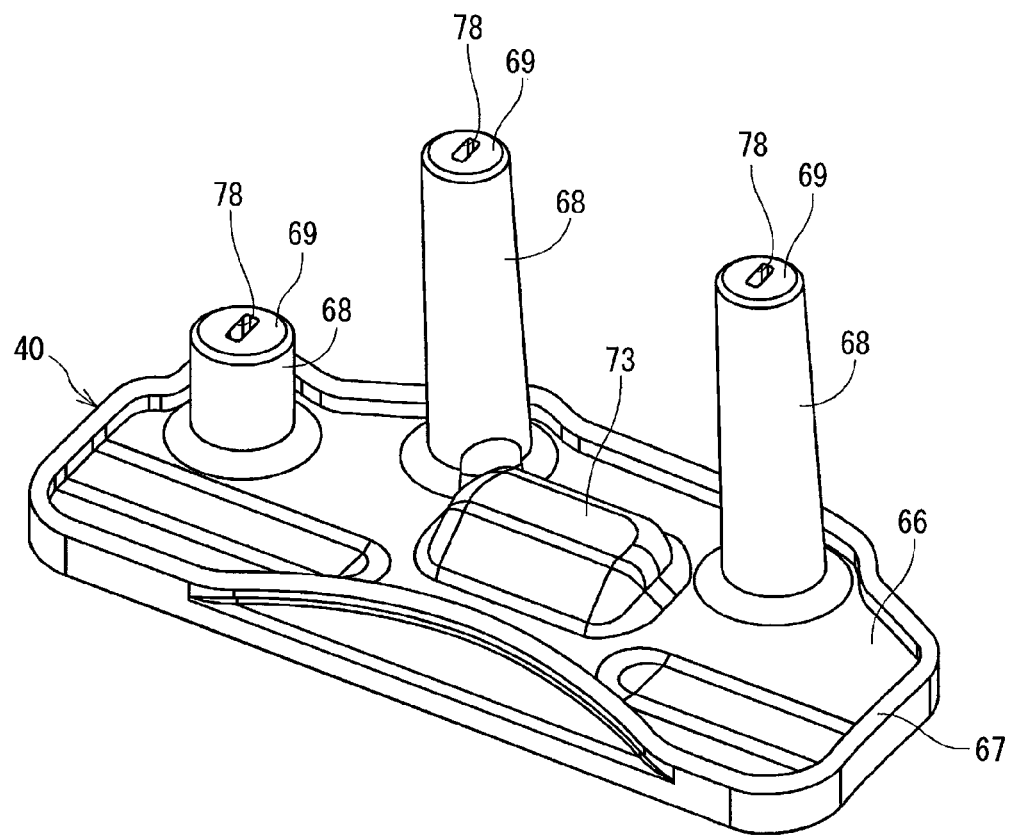
FIG. 5 is a perspective view of a seal member of FIG. 1.

The base portion 66 is formed in a tabular shape along the fixing member opposing face 61, and contacts the fixing member opposing face 61 while does not contact the case opposing face 62. Further, the base portion 66 has three cavities 71 respectively having an inner diameter configured to be greater than an outer diameter of the lead wire 33. Further, as shown in FIG. 4, the base portion 66 has a cover portion 73 which is disposed at a position in between (i) a neutral connection portion 72 of a Y connection of the coil 32 and (ii) the first frame end 25. The cover portion 73 has a concave shape that is depressed toward a first frame end 25 side, and covers the neutral connection portion 72.

The case 22 is equivalent to one of "the fixing member and the case" in the claims, and the first frame end 25 is equivalent to the "other one of the fixing member and the case" in the claims.

As shown in FIG. 3, the rib portion 67 is an annular ring shaped protrusion which protrudes from the base portion 66 toward the first frame end 25 side, and contacts the case opposing face 62. According to the present embodiment, as shown in FIGS. 2-5, the rib portion 67 is disposed on the edge of the base portion 66.

As shown in FIG. 3, the protruding portion 68 having a cylinder shape protrudes into the second through hole 65 from the edge of the cavity 71, with its inner diameter configured to be greater than the outer diameter of the lead wire 33. The protruding portion 68 defines a periphery of the cavity 71. According to the present embodiment, three protruding portions 68 are provided corresponding to the three cavities 71, and the protruding portion 68 protrudes toward a controller 50 side relative to the second through hole 65.

An inside wall surface 74 of the protruding portion 68 is formed in a tapered shape in which an inner diameter of the wall surface 74 decreases from a cavity 71 side toward the opening 78. An inner tip portion 75 of the inside wall surface 74 which is adjacent to the opening 78, among other portions, is configured to have a continuously changing inner diameter continuously changing from the opening 78. That is, the inside wall surface 74 does not have a step shape surface at an in-between position to the opening 78. An outside wall surface 76 of the protruding portion 68 has a tapered shape in which an outer diameter of the outside wall surface 76 decreases along an axial direction as the surface 76 extends away from the base portion 66.

The tip portion 69 is disposed as a part of the protruding portion 68 along the axis thereof, and has the opening 78 that has the lead wire 33 inserted therein and that has the inside wall surface adhering to the lead wire 33. The seal member 40 includes the three openings 78. The surface of the seal member 40 including the inside wall surface of the opening 78 has a surface texturing. According to the present embodiment, the tip portion 69 is disposed on an opposite end of the protruding portion 68 relative to the base portion 66. As shown in FIG. 2, an axial cross section shape of the lead wire 33 is a rectangle, and an axial cross section shape of the opening 78 is a rectangle corresponding to the axial cross section shape of the lead wire 33.

As shown in FIG. 3, the thickness from a sealing surface of the base portion 66 of the seal member 40 to a tip of the rib portion 67, which is measured in a state before the seal member 40 is assembled to the case 22 and to the first frame end 25, is configured to be greater than a distance from the fixing member opposing face 61 to the case opposing face 62. Thereby, when the seal member 40 is attached a position between the case 22 and the first frame end 25, the seal member 40 is fixedly held in a binding manner in between the fixing member opposing face 61 and the case opposing face 62. In addition, the seal member 40 is held only by a binding force from the case 22 and from the first frame end 25.

The area size of an opposing surface of the rib portion 67 of the seal member 40 which opposes the case opposing face 62 is smaller than the area size of an opposing surface of the base portion 66 which opposes the fixing member opposing face 61. Further, while the base portion 66 entirely contacts the fixing member opposing face 61 (i.e., with an entire area thereof), the rib portion 67 contacts the case opposing face 62 only by its tip (as shown in FIG. 3). Therefore, the rib portion 67 has a smaller contact area compared with the base portion 66. Thereby, when the seal member 40 is bound by the fixing member opposing face 61 and the case opposing face 62, a greater degree of deformation is caused by such binding for the rib portion 67 than for the base portion 66.

As shown in FIG. 2, the base portion 66 contacts the fixing member opposing face 61 with its entire periphery that circles the first through hole 64 of the case 22. Further, the opening 78 is smaller than the outer diameter of the lead wire 33 in its original shape, and is expanded when accepting the lead wire 33 inserted therein. Thereby, sealing of the first through hole 64 is airtightly achieved by (i) a contact portion between the base portion 66 of the seal member 40 and the fixing member opposing face 61, and by (ii) a contact portion between the inside wall surface of the opening 78 of the tip portion 69 of the seal member 40 and the lead wire 33, against a space in the second through hole 65 and a space in the cover 39.

The rib portion 67 contacts the case opposing face 62 in a surrounding manner that collectively surrounds three second through holes 65 of the first frame end 25. Thereby, sealing of the second through hole 65 is airtightly achieved by a contact portion between the rib portion 67 of the seal member 40 and the case opposing face 62, and a contact portion between the inside wall surface of the opening 78 of the tip portion 69 of the seal member 40 and the lead wire 33, against a space in the first through hole 64 and a space in the case 22.

The seal member 40 and the first frame end 25 constituted in the above-described way are assembled and attached to the case 22 in a procedure of the following steps (A) and (B).

Figure 6:
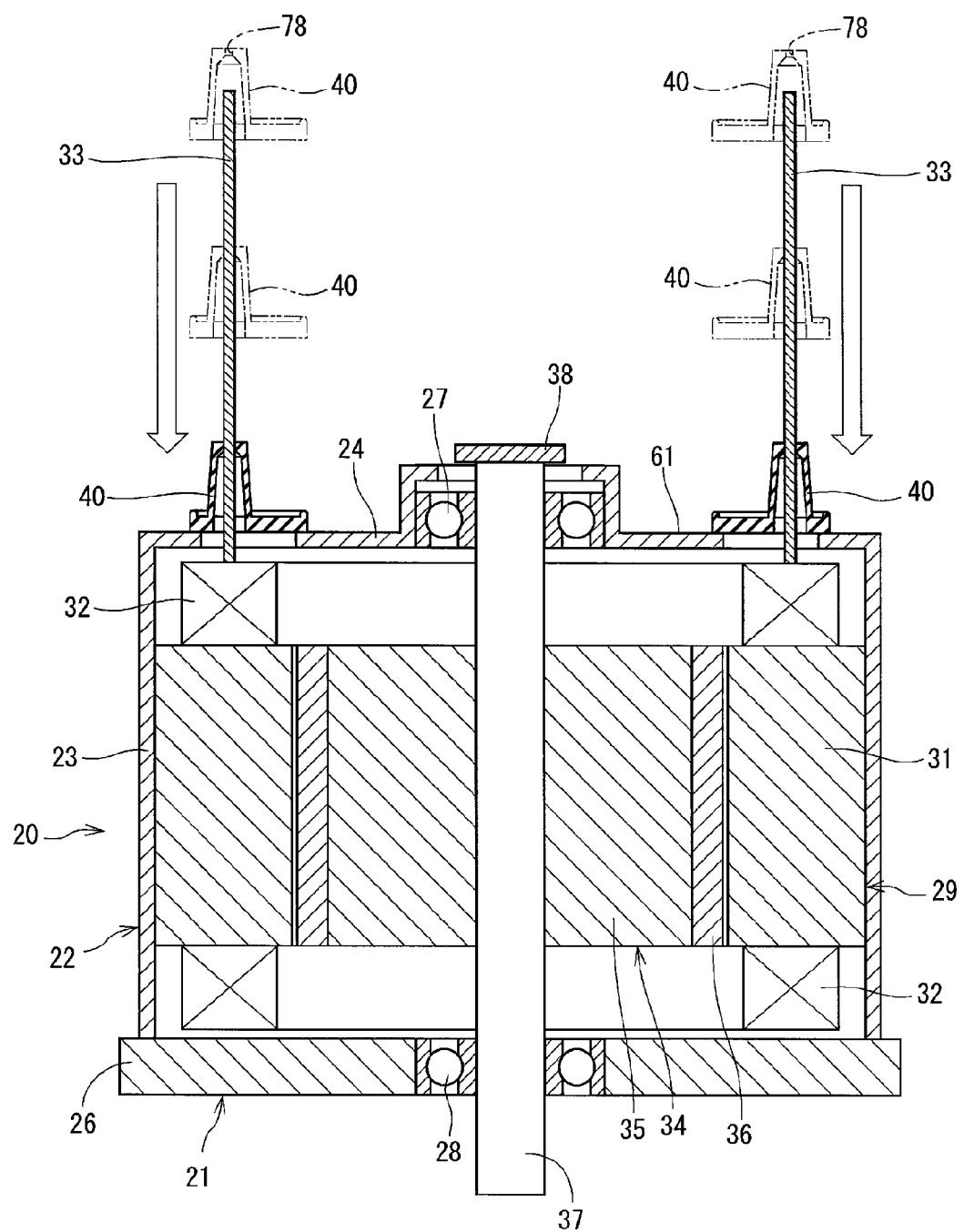
FIG. 6 is an illustration of a first step of assembly for attaching the seal member and the first frame end to a case of FIG. 1.

(A) The lead wire 33 is inserted into the opening 78 of the seal member 40, and the seal member 40 is disposed on the fixing member opposing face 61 of the bottom part 24 of the case 22, as shown in FIG. 6.

Figure 7:
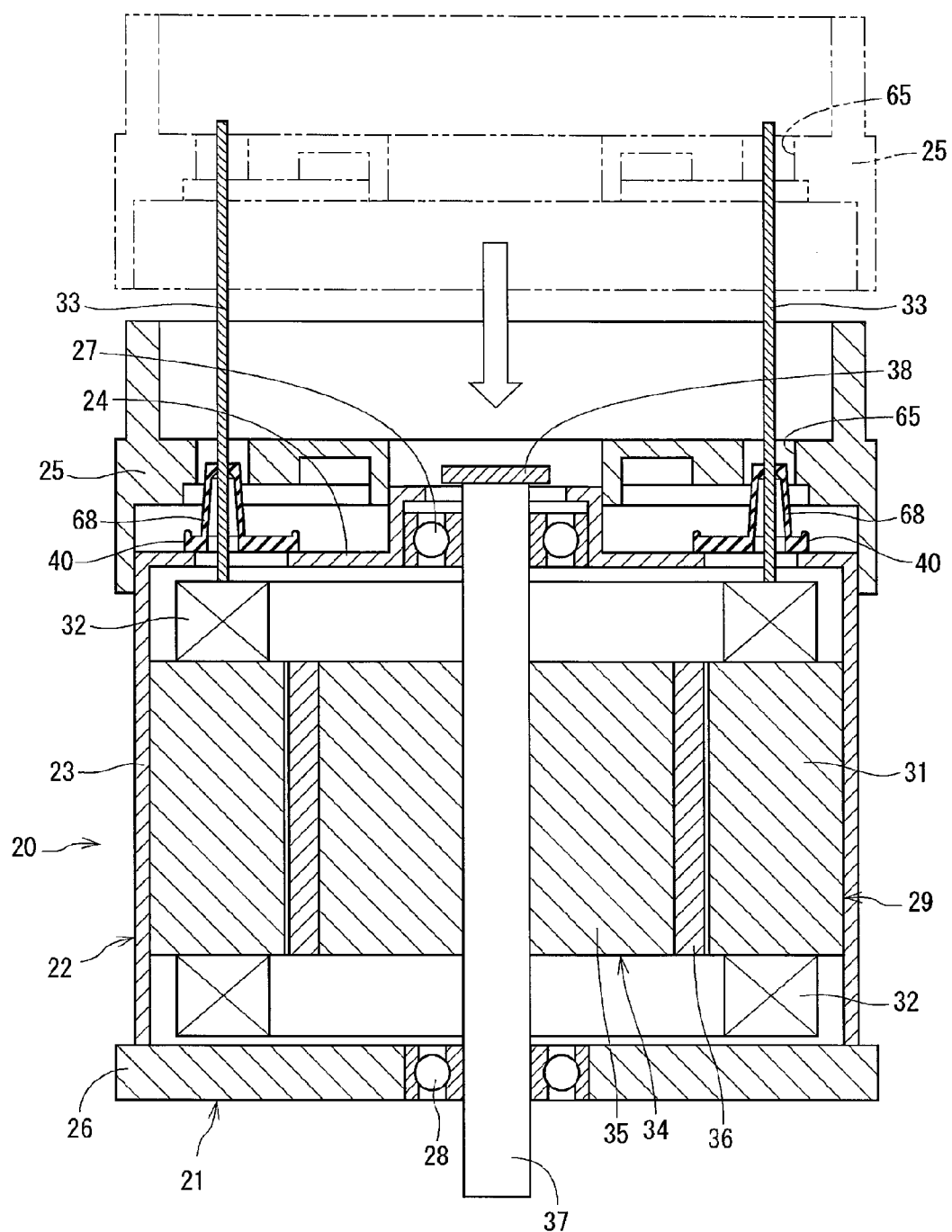
FIG. 7 is an illustration of a second step of assembly for attaching the seal member and the first frame end to the case of FIG. 1.

(B) The lead wire 33 and the protruding portion 68 of the seal member 40 are inserted into the second through hole 65 of the first frame end 25, and the first frame end 25 is assembled to the case 22, as shown in FIG. 7.

[Effect]

As described above, in the present embodiment, the seal member 40 has the opening 78 (i) that contacts the fixing member opposing face 61 of the case 22 and the case opposing face 62 of the first frame end 25, and (ii) that has the lead wire 33 inserted therein and the inside wall surface thereof contacts the lead wire 33. Further, the seal member 40 is made of an elastic material and is held only by a binding force from the case 22 and from the first frame end 25.

The seal member 40 and the first frame end 25 constituted in this way are assembled and attached to the case 22 in the procedure of the above-described steps of (A) and (B).

In such a procedure, even though the seal member 40 is not yet completely fixed/attached to the case 22, handling of the seal member 40 is complete in the step (A), in terms of assembly operation of the member 40. Then, the seal member 40 is fixedly disposed in a binding manner at a position in between the case 22 and the first frame end 25. That is, an installation step for assembling the first frame end 25 to the case 22 simultaneously serves as a fixedly disposing step for disposing the seal member 40 onto the case 22.

Therefore, as for the installation of the seal member 40, the lead wire 33 is inserted into the opening 78, while disposing the seal member 40 onto the case 22, which simplifies and reduces the number of work steps and allows for the automation of such work steps.

Further, in one embodiment, the seal member 40 includes the base portion 66 in a tabular shape, which contacts the case and does not contact the first frame end 25, and includes the annular shape rib portion 67 which protrudes from the base portion 66 on the first frame end 25 side and contacts the first frame end 25.

Thereby, the seal member 40 has its rib portion 67 positively deformed by a binding in between the fixing member opposing face 61 and the case opposing face 62. Therefore, while the seal member 40 securely contacts the fixing member opposing face 61 and the case opposing face 62, a compression load on the seal member 40 is controlled to be a lighter force/pressure as much as possible.

Further, in one embodiment, the base portion 66 of the seal member 40 has the cavity 71 with its inner diameter set to be greater than the outer diameter of the lead wire 33. The seal member 40 has (i) the protruding portion 68 that protrudes into the second through hole 65 from the edge of the cavity 71, and has a cylinder shape with its inner diameter set to be greater than the outer diameter of the lead wire 33, and has (ii) the tip portion 69 that is disposed on one end of the protruding portion 68 along its axis, and has the opening 78.

Therefore, an insertion resistance for inserting the lead wire 33 into the opening 78 is reduced, and the number of work steps for assembling the seal member 40 is reduced. Further, according to the above, the opening 78 may be disposed separately with a space from the base portion 66, and the deformation of a sealing surface of the base portion 66 at the time of inserting the lead wire 33 into the opening 78 is prevented.

Further, in one embodiment, the protruding portion 68 of the seal member 40 protrudes toward the controller 50 side relative to the second through hole 65 (i.e., is exposed from the hole 65). Therefore, in a combined state where the first frame end 25 is assembled to the case 22, whether the seal member 40 has already been attached is confirmed only by viewing.

Further, in one embodiment, the inside wall surface 74 of the protruding portion 68 of the seal member 40 is formed in a tapered shape in which the inner diameter of the wall surface 74 decreases from the cavity 71 side toward the opening 78. Further, the inner tip portion 75 of the inside wall surface 74 which is adjacent to the opening 78, among other portions, is configured to have a continuously changing inner diameter continuously changing from the opening 78.

Therefore, when inserting the lead wire 33 into the protruding portion 68 of the seal member 40, the lead wire 33 is smoothly guided to the opening 78, and the number of work steps for assembling the seal member 40 is reduced.

Further, in one embodiment, the outside wall surface 76 of the protruding portion 68 of the seal member 40 has the tapered shape, and the outer diameter of the of the tapered shape is set to be small as the outside wall surface 76 extends away from the base portion 66 along the axis thereof.

Therefore, when assembling the first frame end 25 to the case 22, the protruding portion 68 of the seal member 40 is smoothly inserted into the second through hole 65 of the first frame end 25, and the number of work steps for assembling the seal member 40 is reduced.

Further, in one embodiment, the axial cross section shape of the lead wire 33 is a rectangle, and the axial cross section shape of the opening 78 is a rectangle corresponding to the axial cross section shape of the lead wire 33. In other words, the lead wire (33) and the opening (78) have corresponding square-shaped cross sections.

Thereby, by simply inserting the lead wire 33 into the opening 78, the position of the seal member 40 against/relative to the lead wire 33 is determined. Therefore, a determination step or a determination device for determining the position of the seal member 40 against/relative to the lead wire 33 is not required.

Further, in one embodiment, multiple lead wires 33 are provided and the seal member 40 has the same number of the lead wires 33 and the openings 78. In other words, the seal member 40 has a plurality of openings corresponding to a quantity of a plurality of lead wires 33.

Therefore, one seal member 40 can seal three second through holes 65 on the first frame end 25.

Further, in one embodiment, a surface texturing is provided on the inside wall surface of the opening 78.

Therefore, the insertion resistance for inserting the lead wire 33 into the opening 78 is reduced, and the number of work steps for assembling the seal member 40 is reduced.

Further, in one embodiment, the base portion 66 of the seal member 40 has the cover portion 73 which is disposed at a position in between the first frame end 25 and the neutral connection portion 72 of the coil 32.

Thereby, the electric short circuit of the neutral connection portion 72 and the first frame end 25 is prevented, with a potential part left in an exposed manner. Therefore, the distance between the neutral connection portion 72 and the first frame end 25 is decreased as much as possible, and the volume of the driver apparatus 10 is reduced along the axial direction.

Further, in one embodiment, the cover portion 73 of the seal member 40 is formed to have a concave shape that is depressed (i.e., decreases or concaves) toward the first frame end 25 side, and covers the neutral connection portion 72.

Thereby, the neutral connection portion 72 is protected from a mechanical stress.

Other Embodiments

In other embodiments of the present disclosure, a seal member may have a base portion only or may have a base portion and a rib portion only. In such a case, an opening may be disposed in a base portion.

According to other embodiments of the present disclosure, one seal member may be provided corresponding to one lead wire or to two lead wires. Further, four or more lead wires may be sealed by one seal member.

According to other embodiments of the present disclosure, a protruding portion of the seal member may not protrude toward a control unit side relative to the second through hole. That is, the protruding portion of the seal member does not need to penetrate the first frame end.

According to other embodiments of the present disclosure, the inside wall surface and the outside wall surface of the protruding portion of the seal member may be formed in parallel with the axis thereof, instead of having the tapered shape.

According to other embodiments of the present disclosure, a step shape surface may be formed at a position between the inside wall surface of the protruding portion of the seal member and the opening.

In other embodiments of the present disclosure, the cross section shape of the lead wire and the cross section shape of the opening of the seal member may be a shape other than a rectangle, i.e., may be a round shape, etc.

According to other embodiments of the present disclosure, the inside wall surface of the opening needs not have a surface texturing.

According to other embodiments of the present disclosure, the connection of the coil may be other than the Y connection.

According to other embodiments of the present disclosure, a drive apparatus may be applied to a device other than the electric power steering device.

Although the present disclosure has been fully described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A driver apparatus comprising:
   a case;
   a stator fixedly disposed in the case;
   a rotor rotatably disposed relative to the stator;
   a fixing member attached to the case;
   a controller fixedly disposed proximate to the fixing member and configured to control a power supply to a coil of the stator; and
   a seal member partially disposed at a position between the case and the fixing member, wherein
   the case has a fixing member opposing face that faces the fixing member, and the fixing member has a case opposing face that faces the fixing member opposing face of the case,
   the case has a first through hole that opens on the fixing member opposing face through which a lead wire of the coil is inserted,
   the fixing member has a second through hole that opens on the case opposing face through which the lead wire is inserted, and
   the seal member is of a stretchable material and contacts the fixing member opposing face and the case opposing face, the seal member held in position solely by a binding force between the case and the fixing member, wherein the seal member includes:
   an opening through which the lead wire is inserted, the opening having an inside wall surface configured to contact the lead wire;
   a base portion in contact with one of the fixing member or the case and in non-contact with an other of the fixing member or the case, the base portion having a cavity with an inner diameter greater than an outer diameter of the lead wire;

a rib portion having a ring shape and protruding from the base portion toward and being in contact with the other of the fixing member or the case; and a protruding portion that protrudes from the base portion to define a periphery of the cavity, the protruding portion protrudes into the second through hole and has a tip portion that is disposed on one axial end of the protruding portion, the opening is positioned on the tip portion, and the protruding portion has a cylinder shape with an inner diameter that is greater than the outer diameter of the lead wire.

2. The driver apparatus of claim 1, wherein
the protruding portion of the seal member protrudes toward the controller relative to the second through hole.

3. The driver apparatus of claim 1, wherein
an inside wall surface of the protruding portion of the seal member has a tapered shape with a decreasing inner diameter that decreases toward the opening relative to the cavity.

4. The driver apparatus of claim 3, wherein
the seal member has an inner tip portion that is connected to the inside wall surface of the protruding portion and positioned adjacent to the opening on a cavity side of the tip portion, and the inner tip portion has an inner diameter that continuously changes from the opening to the inside wall surface.

5. The driver apparatus of claim 1, wherein
the protruding portion has an outside wall surface with a tapered shape and a decreasing outer diameter along an axial direction away from the base portion.

6. The driver apparatus of claim 1, wherein the lead wire and the opening have corresponding rectangular-shaped cross sections.

7. The driver apparatus of claim 1, further comprising:
a plurality of lead wires, wherein
the seal member has a plurality of openings corresponding to a quantity of the plurality of lead wires.

8. The driver apparatus of claim 1, wherein
the inside wall surface of the opening has surface texturing.

9. The driver apparatus of claim 1, wherein
the coil has a neutral connection portion that protrudes toward the fixing member, and the base portion of the seal member has a cover portion that is positioned between the fixing member and the neutral connection portion.

10. The driver apparatus of claim 1, wherein
the driver apparatus serves as a power source for driving an in-vehicle power steering apparatus.

11. The driver apparatus of claim 9, wherein
the cover portion of the seal member has a concave shape that concaves toward a fixing member and covers the neutral connection portion.

12. A driver apparatus comprising:
a case;
a stator fixedly disposed in the case;
a rotor rotatably disposed relative to the stator;
a fixing member attached to the case;
a controller fixedly disposed proximate to the fixing member, the controller configured to control a power supply to a coil of the stator; and
a seal member partially disposed at a position between the case and the fixing member, wherein
the case has a fixing member opposing face that faces the fixing member, and the fixing member has a case opposing face that faces the fixing member opposing face of the case,
the case has a first through hole that opens on the fixing member opposing face through which a lead wire of the coil is inserted,
the fixing member has a second through hole that opens on the case opposing face through which the lead wire is inserted,
the coil has a neutral connection portion that protrudes toward the fixing member, and
the seal member is of a stretchable material and contacts the fixing member opposing face and the case opposing face, the seal member held in position solely by a binding force between the case and the fixing member, wherein the seal member includes:
an opening through which the lead wire is inserted, the opening having an inside wall surface configured to contact the lead wire; and
a base portion in contact with one of the fixing member or the case and in non-contact with an other of the fixing member or the case, the base portion having a cover portion that is positioned between the fixing member and the neutral connection portion.

\* \* \* \* \*

UNITED STATES PATENT AND TRADEMARK OFFICE
CERTIFICATE OF CORRECTION

PATENT NO. : 9,893,586 B2
APPLICATION NO. : 14/609517
DATED : February 13, 2018
INVENTOR(S) : Tomizawa et al.

It is certified that error appears in the above-identified patent and that said Letters Patent is hereby corrected as shown below:

On the Title Page

Item (72) Inventors:
HIroki Tomizawa, Chiryu (JP)

Should be:
Hiroki Tomizawa, Chiryu (JP)

Signed and Sealed this
Tenth Day of April, 2018

Andrei Iancu
*Director of the United States Patent and Trademark Office*